Patented Nov. 7, 1939

2,178,705

UNITED STATES PATENT OFFICE 2,178,705

PREPARATION OF MINERAL OILS FOR USE IN PAINT AND THE LIKE

Allan B. Ruddle, San Francisco, Calif.

No Drawing. Application November 27, 1936, Serial No. 113,009

4 Claims. (Cl. 134—56)

The present invention relates to the preparation of mineral or petroleum oil in a manner that will render it suitable for use as one of the principal constituents of paint or suitable for other uses where a drying oil is required, and more specifically to a treatment of mineral oil that will cause it to harden or dry when applied as a coating to a surface in the manner of paint.

Mineral oils are reputedly unsatisfactory as a vehicle for paint bases and pigments because they do not oxidize or dry in the manner of the more costly and customarily used vegetable oils and the like.

It is therefore the principal object of the present invention to prepare a mineral oil in such a manner that it will be suitable for use as a vehicle for the common constituents of oil paints, and so that a readily drying and generally serviceable paint may be made of a mixture containing mineral or petroleum oil to the exclusion of all other oils.

A further object is the provision of a quick drying petroleum oil which may be used in place of more costly oils wherever drying is desired, such for example as the so-called core oil which is mixed with sand in metal casting foundry practice.

Further objects and advantages of the invention are made apparent in the following specification, wherein the invention is described in detail for the purpose of illustrating a preferred form thereof.

I have discovered that mineral oils may be caused to dry or harden to the extent that they may be used in paints by mixing with them, in varying proportions, an alkali metal silicate, an alkali metal fluosilicate, and either an acid or an alum. I have found that upon mixing these substances in suitable proportions, and preferably while warm and agitated, with inexpensive grades of petroleum oils, a liquid forms which will receive common paint bases such as white or red lead, either ground in oil or in dry powder form, and which is suitable for the reception of all commonly used oil paint pigments to produce a variety of colors.

The adhering qualities of paints made in this manner are improved by the addition, in small quantities, of an adhesive agent. Rosin may be used for this purpose, as well as some forms of rubber or various glues.

A wide range of substances to modify the specific characteristics of the paint is made possible by the fact that it contains large quantities of both water and oil, apparently in emulsion, and therefore substances that mix readily with either oil or water may be added in limited quantities. For example, paints made in accordance with my invention may be thinned when necessary to a suitable consistency for application with a brush or spray gun by the addition of water, as well as by the addition of commercial thinners of an oily nature, such for example as petroleum thinner.

In preparing the mineral oil for the purpose set forth above, it is preferred that the materials used be such as are available at relatively low cost. Sodium silicate and sodium fluosilicate meet this requirement and are typical of the alkali metal silicates and fluosilicates that may be used. Aluminum sulphate is an example of an inexpensive alum-like substance that is suitable for the purpose of the present invention.

In preparing mineral oils for use in paint, I first form a solution of about

| | | |
|---|---|---|
| Water | gal | 1 |
| Aluminum sulphate | ozs | 1 to 10 |
| Alkali metal fluosilicate | ozs | 1 to 10 | and

| | | |
|---|---|---|
| Alkali metal silicate | gals | 2 to 20 |

The solution made within the limits specified in the above formula should be a clear liquid of about 30° Baumé.

Such a solution is mixed with the mineral oil in proportions varying from say, 5% to 50% of the solution to 5% to 50% of the oil, by volume, the exact proportions depending upon the viscosity and other characteristics of the particular grade of oil used. The mixture is heated and stirred and when thoroughly mixed and at a temperature of about 300° F., a slightly acid precipitant, such as dry powdered aluminum sulphate is added, agitation being maintained during and for a short time after its addition. The exact proportion of the precipitating agent will vary in different mixtures, but using the above formula about 10% of total mixture has been found satisfactory, but this will vary with the acid content, the higher percentage of acid the faster the oil will be dried.

The result is the formation of an insoluble, crystalline precipitate which acts with the oil in such a manner that upon its application to a surface as paint, it becomes hard and dry.

Where an adhesive agent is desired, it may be added to the oil, preferably before the solution given in the formula above is added. In using gums or resins for this purpose, it is desirable to heat the oil so as to dissolve the agent and facilitate its thorough mixture with the oil. Commercial synthetic resins are suitable for this purpose and desirable because of their ready availability.

It has been found that mineral oils prepared in the manner described above may be mixed with any of the common ingredients of oil paints to produce a quick-drying, serviceable paint that is highly resistant to the deteriorating effects of heat and moisture. The paint so made is also receptive to talc and other finely ground, inert substances to vary its consistency, body and color. Likewise the oil may be used for other purposes, such as in the manufacture of ink, where a drying oil is required.

While certain features of the invention are set forth specifically herein, it is to be understood that the details described may be varied without departing from the spirit of the invention the scope of which is defined in the appended claims.

Having described my invention, what I claim is—

1. The method of preparing mineral oil to cause it to dry which comprises adding thereto a solution of an alkali metal silicate and an alkali metal fluosilicate, thoroughly mixing and heating, and then adding aluminum sulphate.

2. The method of preparing mineral oil for use in paints which comprises adding thereto a solution of an alkali metal silicate and an alkali metal fluosilicate, thoroughly mixing and heating, and then adding an alum.

3. The method of preparing petroleum oil for use in paints which comprises adding thereto a solution consisting of the following formula:

| | | |
|---|---|---|
| Water | gal | 1 |
| Aluminum sulphate | ozs | 1 to 10 |
| Alkali metal fluosilicate | ozs | 1 to 10 | and

| | | |
|---|---|---|
| Alkali metal silicate | gals | 2 to 20 | mixing and heating, and then adding aluminum sulphate.

4. The method of preparing petroleum oil for use in paints which comprises adding thereto a small quantity of an adhesive agent and approximately 50% of a solution consisting of the following formula:

| | | |
|---|---|---|
| Water | gal | 1 |
| Aluminum sulphate | ozs | 1 to 10 |
| Alkali metal fluosilicate | ozs | 1 to 10 | and

| | | |
|---|---|---|
| Alkali metal silicate | gals | 2 to 20 | mixing and heating, and then adding aluminum sulphate.

ALLAN B. RUDDLE.